US011464283B2

(12) United States Patent
Ahn

(10) Patent No.: US 11,464,283 B2
(45) Date of Patent: Oct. 11, 2022

(54) SHOE SOLE WITH POLYHEDRAL CELL AND MANUFACTURING METHOD THEREFOR

(71) Applicant: Hee Jung Ahn, Gimhae-si (KR)

(72) Inventor: Hee Jung Ahn, Gimhae-si (KR)

( * ) Notice: Subject to any disclaimer, the term of this patent is extended or adjusted under 35 U.S.C. 154(b) by 366 days.

(21) Appl. No.: 16/583,356

(22) Filed: Sep. 26, 2019

(65) Prior Publication Data

US 2020/0107609 A1 Apr. 9, 2020

(30) Foreign Application Priority Data

Oct. 4, 2018 (KR) .................. 10-2018-0117962

(51) Int. Cl.
| | | |
|---|---|---|
| *A43B 13/18* | (2006.01) | |
| *A43B 13/04* | (2006.01) | |
| *B29D 35/00* | (2010.01) | |
| *B29D 35/12* | (2010.01) | |
| *B29C 43/00* | (2006.01) | |

(52) U.S. Cl.
CPC ............ *A43B 13/181* (2013.01); *A43B 13/04* (2013.01); *B29C 43/006* (2013.01); *B29D 35/0054* (2013.01); *B29D 35/122* (2013.01)

(58) Field of Classification Search
CPC ..... A43B 13/181; A43B 13/04; B29C 43/006; B29D 35/0054; B29D 35/122
See application file for complete search history.

(56) References Cited

U.S. PATENT DOCUMENTS

| 2014/0182170 A1* | 7/2014 | Wawrousek | ............. A43D 1/02 |
| | | | 36/103 |
| 2016/0150855 A1* | 6/2016 | Peyton | ................. A43B 1/0072 |
| | | | 36/29 |

FOREIGN PATENT DOCUMENTS

| CN | 106998843 A | 8/2017 |
| CN | 107139428 A | 9/2017 |
| JP | 2001-299409 A | 10/2001 |
| KR | 20-0237469 Y1 | 9/2001 |
| KR | 10-2003-0029577 A | 4/2003 |
| KR | 20-0402582 Y1 | 12/2005 |
| KR | 10-2014-0045566 A | 4/2014 |

* cited by examiner

*Primary Examiner* — Stella K Yi
(74) *Attorney, Agent, or Firm* — Novick, Kim & Lee PLLC; Jae Youn Kim

(57) ABSTRACT

Provided is a shoe sole having a structure in which a polyhedral hollow cell made of a synthetic resin, configured as a polyhedron, and having an empty space formed therein is bonded with other polyhedral hollow cells by a hot melt adhesive part, wherein the hot melt adhesive part is provided between the multiple polyhedral hollow cells so that no voids are formed therebetween, and a plane structure of the polyhedral hollow cells bonded with each other has a shape of a human sole.

1 Claim, 5 Drawing Sheets

SHOE SOLE WITH POLYHEDRAL CELL AND MANUFACTURING METHOD THEREFOR

CROSS REFERENCE TO RELATED APPLICATION

The present application claims priority to Korean Patent Application No. 10-2018-0117962, filed Oct. 4, 2018, the entire content of which is incorporated herein for all purposes by this reference.

BACKGROUND OF THE INVENTION

Field of the Invention

The present invention relates to a shoe sole having polyhedral hollow cells and a method of manufacturing the same. More particularly, the present invention relates to a shoe sole having polyhedral hollow cells and a method of manufacturing the same, the shoe sole being manufactured using polyhedral hollow cells.

Description of the Related Art

Human feet function to bear weight when walking or running and impact is directly transmitted from the ground. Especially, when a person exercises, the feet of the person are continually shocked several times the weight of the person exercising. Accordingly, wearing shock-absorbing shoes plays an important role in human health to protect feet, to alleviate shocks, and to move freely.

A shoe is generally divided into an upper, a midsole, and an outsole.

A midsole absorbs shock.

An outsole is a part contacting the ground and generally made of a material that prevents slipping, and is sometimes omitted.

However, as it is impossible to effectively absorb impact with only the material of the sole, especially a material of the midsole, a technique has been used in which an air cushion is mounted in a heel portion of the midsole. This is because the sole of the foot, especially the heel, receives the strongest impact from the ground.

However, the conventional air cushion for shoes may be burst or torn when exposed to severe impact or pointed objects.

Due to this problem, the air cushion for a shoe is generally mounted inside the midsole by insert molding when manufacturing the midsole.

There is a proposal in which the entire sole is configured as an air cushion structure, but in this case, it is difficult to be commercialized because the sole can easily be burst or torn.

Korean Utility Model No. 20-0237469 discloses SHOE MIDSOLE HAVING IMPACT ABSORPTION POWER AND PUSHING FUNCTION, registered on Jun. 28, 2001. The shoe midsole in this related art is configured with at least one accommodating portion inside the midsole having the same shape as the bottom of the foot, wherein elastomeric balls are provided in each accommodating portion so that the midsole can absorb impact due to gaps between the balls which absorb expansion of the balls.

However, in the related art, the balls move freely in the accommodating portion, and the gaps between the balls are formed irregularly. Thus, it is difficult to make a product having a narrow error range in terms of quality and performance, such as elasticity or hardness.

SUMMARY OF THE INVENTION

Accordingly, the present invention has been made keeping in mind the above problems occurring in the related art, and an objective of the present invention is to propose a shoe sole having an advanced structure and a method of manufacturing the same, wherein the shoe sole is constituted by multiple polyhedral hollow cells to maximize buffering of impacts, the shoe sole maintains the structure thereof to some extent due to the remaining polyhedral hollow cells even when any one of the polyhedral hollow cells is burst or torn, and no voids are formed between the polyhedral hollow cells so that it is possible to effectively control elasticity and hardness characteristics of the shoe sole.

In order to achieve the above objective, there is provided a method of manufacturing a shoe sole having polyhedral hollow cells, the method including: preparing multiple elastic balls each including a ball-shaped synthetic resin inner layer defining a space therein and a hot melt outer layer provided to cover an outer surface of the synthetic resin inner layer; loading the elastic balls in a shoe sole mold; heating and compressing the elastic balls loaded in the shoe sole mold under a vacuum atmosphere such that ball-shaped synthetic resin inner layers of the elastic balls are transformed into polyhedral hollow cells by compression, the cells being polyhedrons and each having an empty space formed therein, and hot melt outer layers of the elastic balls are transformed into a molten hot melt that is melted by heating and fills between multiple polyhedral hollow cells; cooling the polyhedral hollow cells while maintaining the compression state after the heating and compressing such that the molten hot melt is cooled and transformed into a hot melt adhesive part; and removing the shoe sole mold after the cooling to obtain a shoe sole with a polyhedral hollow cell.

In order to achieve another objective of the present invention, there is provided a shoe sole having polyhedral hollow cells, the shoe sole having a structure in which a polyhedral hollow cell made of a synthetic resin, configured as a polyhedron, and having an empty space formed therein is bonded with other polyhedral hollow cells by a hot melt adhesive part, wherein the hot melt adhesive part is provided between the multiple polyhedral hollow cells so that no voids are formed therebetween, and a plane structure of the polyhedral hollow cells bonded with each other has a shape of a human sole.

The shoe sole may be divided into a first zone located at a rear outer side of a plan view, a second zone located at a rear inner side of the plan view, and a third zone located at a front side of the plan view, wherein a layer thickness of the polyhedral hollow cells located in the first zone may be greater than a layer thickness of the polyhedral hollow cells located in the second zone, and the layer thickness of the polyhedral hollow cells located in the second zone may be greater than a layer thickness of the polyhedral hollow cells located in the third zone.

The shoe sole may be divided into a first zone located at a rear outer side of a plan view, a second zone located at a rear inner side of the plan view, and a third zone located at a front side of the plan view, wherein a hardness of the polyhedral hollow cells located in the first zone may be greater than a hardness of the polyhedral hollow cells located in the second zone, and the hardness of the polyhedral hollow cells located in the second zone may be greater than a hardness of the polyhedral hollow cells located in the third zone.

As described above, the present invention provides a shoe sole having an advanced structure and a method of manufacturing the same in which the shoe sole is constituted by multiple polyhedral hollow cells, thereby maximizing buffering of impacts. In addition, even when any one of the polyhedral hollow cells is burst or torn, the shoe sole can maintain the structure thereof to some extent due to the remaining polyhedral hollow cells. Furthermore, no voids are formed between the polyhedral hollow cells so that it is possible to effectively control the elasticity and hardness characteristics of the shoe sole.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
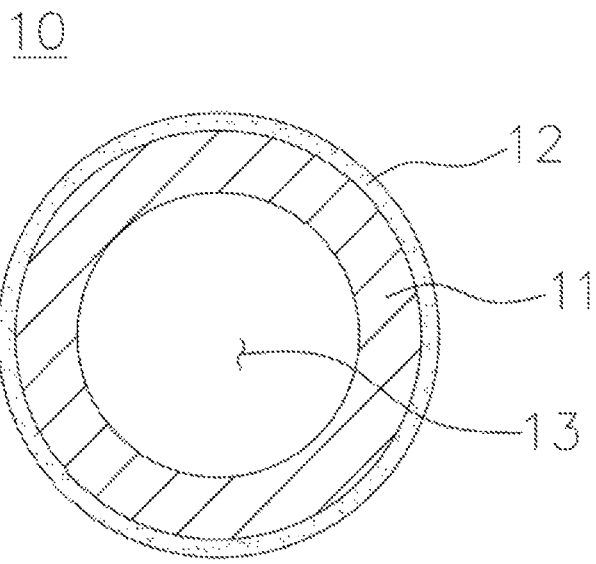
FIG. 1 is a cross-sectional view illustrating an elastic ball used in a first embodiment of the present invention.

Hereinbelow, embodiments of the present invention will be described in detail with reference to the accompanying drawings such that the invention can be easily embodied by one of ordinary skill in the art to which this invention belongs. However, it should be understood that the embodiments of the present invention may be changed to a variety of embodiments and the scope and spirit of the present invention are not limited to the embodiment described hereinbelow. In the following description, it is to be noted that, when the functions of conventional elements and the detailed description of elements related with the present invention may make the gist of the present invention unclear, a detailed description of those elements will be omitted. Wherever possible, the same reference numerals will be used throughout the drawings and the description to refer to the same or like elements or parts.

Throughout the description, it will be further understood that the terms "comprises", "comprising", "includes" and/or "including" when used herein, specify the presence of stated features, integers, steps, operations, elements, and/or components, but do not preclude the presence or addition of one or more other features, integers, steps, operations, elements, components, and/or groups thereof, unless the context clearly indicates otherwise.

A first embodiment according to the present invention will be described.

Figure 2:
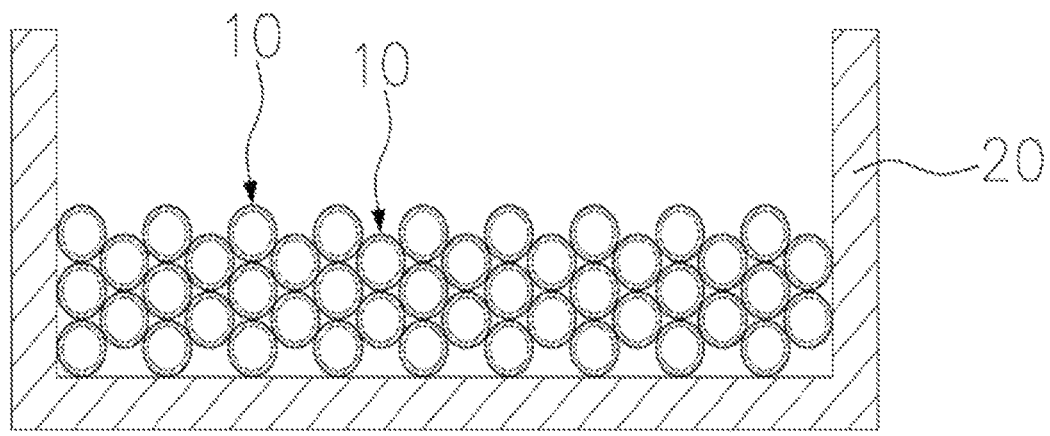
FIG. 2 is a schematic view illustrating a state where multiple elastic balls are loaded in a shoe sole mold according to the first embodiment of the present invention.
Figure 3:
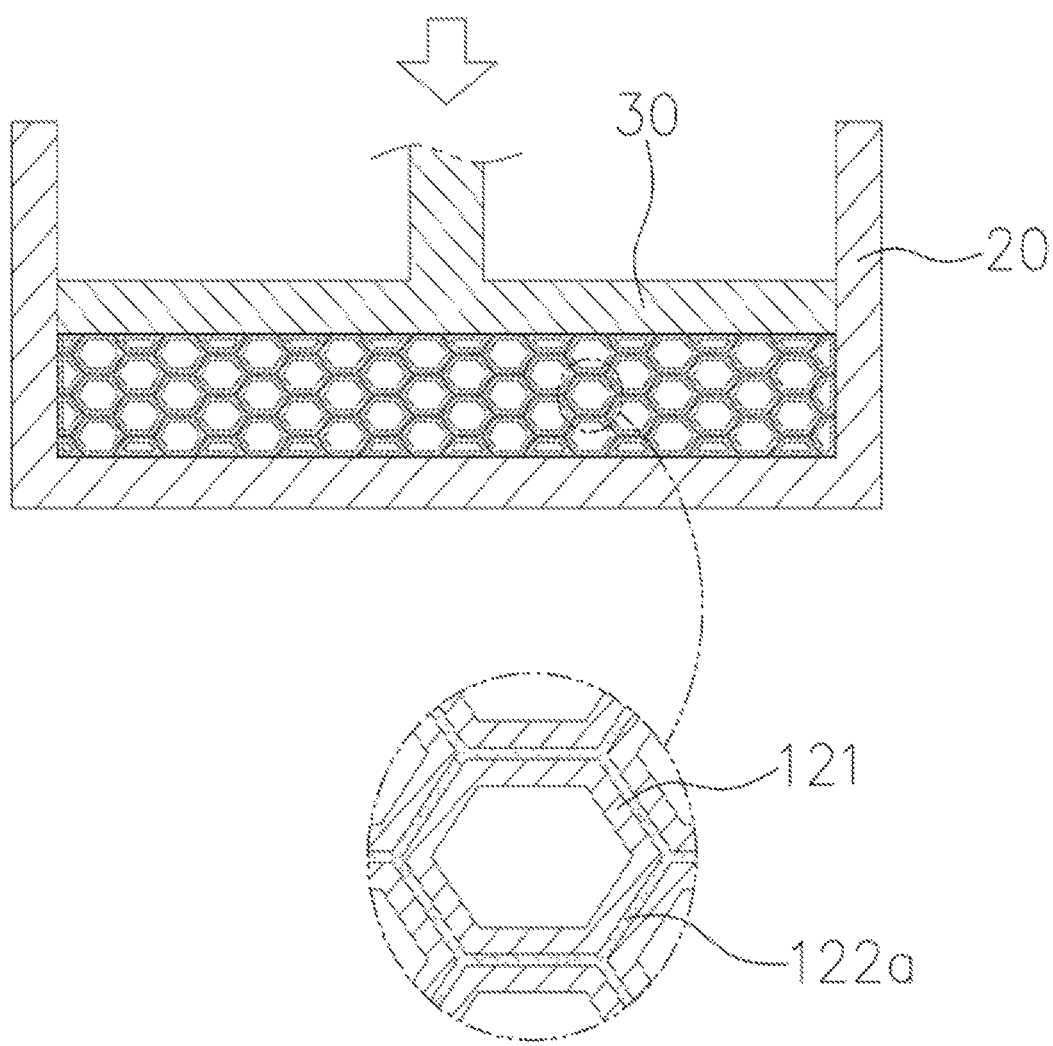
FIG. 3 is a schematic view illustrating a state where the multiple elastic balls loaded in the shoe sole mold are heated and compressed according to the first embodiment of the present invention.
Figure 4:
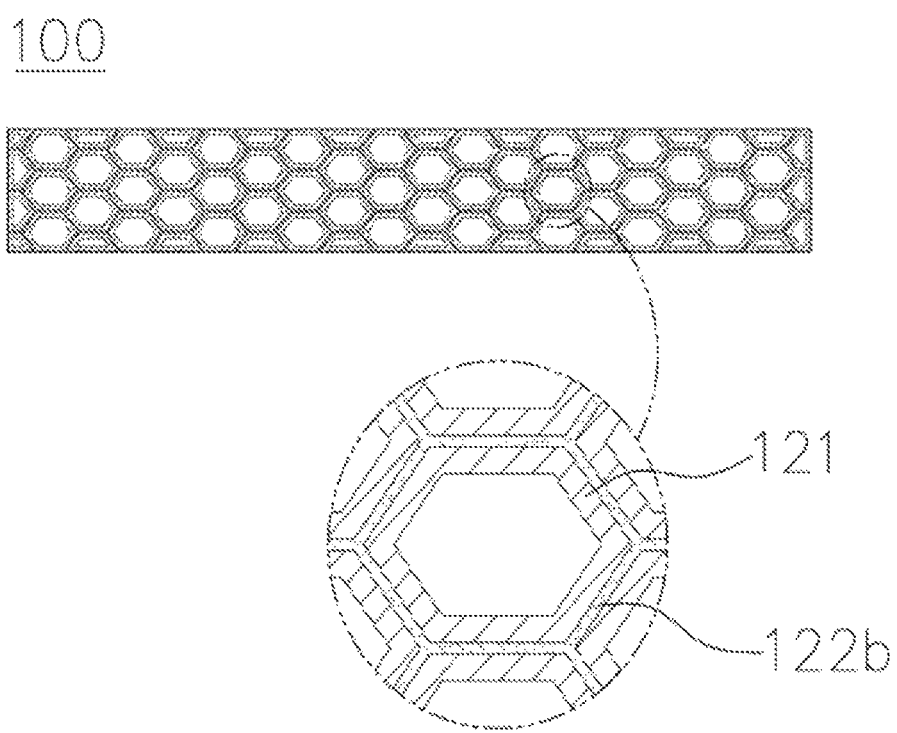
FIG. 4 is a schematic view illustrating a shoe sole obtained according to the first embodiment of the present invention.

FIG. 1 is a cross-sectional view illustrating an elastic ball used in the first embodiment of the present invention; FIG. 2 is a schematic view illustrating a state where multiple elastic balls are loaded in a shoe sole mold according to the first embodiment of the present invention; FIG. 3 is a schematic view illustrating a state where the multiple elastic balls loaded in the shoe sole mold are heated and compressed according to the first embodiment of the present invention; and FIG. 4 is a schematic view illustrating a shoe sole obtained according to the first embodiment of the present invention.

A method of manufacturing a shoe sole according to the embodiment of the present invention will be described.

(1) Elastic Ball Preparing Step

Multiple elastic balls 10 are prepared.

In this embodiment, a shoe sole is manufactured using the elastic balls 10 having the same material and the same thickness.

As illustrated in FIG. 1, each of the elastic balls 10 includes a ball-shaped synthetic resin inner layer 11 defining a space 13 therein and a hot melt outer layer 12 provided to cover an outer surface of the synthetic resin inner layer 11.

Air is filled in the space 13 defined by the elastic ball 10. However, depending on embodiments, nitrogen or the like may be filled in the space 13 defined by the elastic ball 10.

(2) Elastic Ball Loading Step

As illustrated in FIG. 2, the prepared elastic balls 10 are loaded in a shoe sole mold 20.

The volume of the elastic balls 10 loaded in the shoe sole mold 20 is greater than a desired volume of a shoe sole.

A shape of the shoe sole mold 20 may vary depending on a desired shape of a shoe sole.

(3) Heating and Compressing Step

The elastic balls 10 loaded in the shoe sole mold 20 are heated under a vacuum atmosphere. When each hot melt outer layer 12 of the elastic balls 10 starts to melt by heating, the elastic balls 10 loaded in the shoe sole mold 20 are compressed using a press 30 as illustrated in FIG. 3.

In such vacuum atmosphere, ball-shaped synthetic resin inner layers 11 of the elastic balls 10 are transformed into polyhedral hollow cells 121 by compression, the cells being polyhedrons and each having an empty space formed therein. In addition, in such vacuum atmosphere, hot melt outer layers 12 of the elastic balls 10 are transformed into a molten hot melt 122a that is melted by heating and fills between the multiple polyhedral hollow cells 121.

As described above, the synthetic resin inner layers 11 are transformed into the polyhedron hollow cells 121, and the molten hot melt 122a fills between the polyhedral hollow cells 121, whereby no voids are formed between the polyhedron hollow cells 121.

In this embodiment, the heating and compressing is performed under a vacuum atmosphere, thereby effectively preventing the formation of voids between the polyhedral hollow cells 121.

(4) Cooling Step

After the heating and compressing step, the polyhedral hollow cells 121 are cooled while maintaining the compression state so that the molten hot melt 122a is cooled and transformed into a hot melt adhesive part 122b while shapes of the polyhedral hollow cells 121 are maintained.

That is, when natural cooling is performed in the state of FIG. 3, the molten hot melt 122a is solidified into the hot melt adhesive part 122b which is in the solid state.

(5) Shoe Sole Mold Removing Step

After the cooling step, the shoe sole mold 20 is removed to obtain a shoe sole 100 having polyhedral hollow cells which is illustrated in FIG. 4.

That is, the shoe sole 100 with polyhedral hollow cells has a sole structure in which a plane has a shape of a human sole by means of the polyhedral hollow cells 121.

The shoe sole 100 obtained by the embodiment has a structure in which the polyhedral hollow cells 121 made of a synthetic resin and each having a hollow space formed therein are bonded with other polyhedral hollow cells 121 by the hot melt adhesive part 122b.

In particular, the shoe sole 100 has a structure in which only the hot melt adhesive part 122b exists between the polyhedral hollow cells 121, and thus no voids are formed.

That is, the shoe sole 100 has a stable structure because all surfaces of the polyhedral hollow cells 121 are bonded to outer surfaces of other polyhedral hollow cells 121 by the hot melt adhesive part 122b.

In addition, the entire shoe sole 100 is constituted by the polyhedral hollow cells 121, thereby maximizing buffering of impacts.

In addition, even when any one of the polyhedral hollow cells 121 is burst or torn, the shoe sole 100 can maintain the structure thereof to some extent due to the remaining polyhedral hollow cells 121, thereby ensuring safety while walking.

In addition, the shoe sole 100 has no voids between the polyhedral hollow cells 121, and thus the elasticity and hardness of the shoe sole 100 are only affected by the characteristics of the polyhedral hollow cells 121. Thus, it is possible to effectively control the elasticity and hardness characteristics of the shoe sole 100 by adjusting the characteristics of the polyhedral hollow cells 121.

The shoe sole 100 of the embodiment is configured by the elastic balls 10 having the same structure and material so that all parts thereof have the same elasticity and hardness.

However, it is preferable to have different hardness and different elasticity according to parts contacting the human sole as follows.

Figure 5:
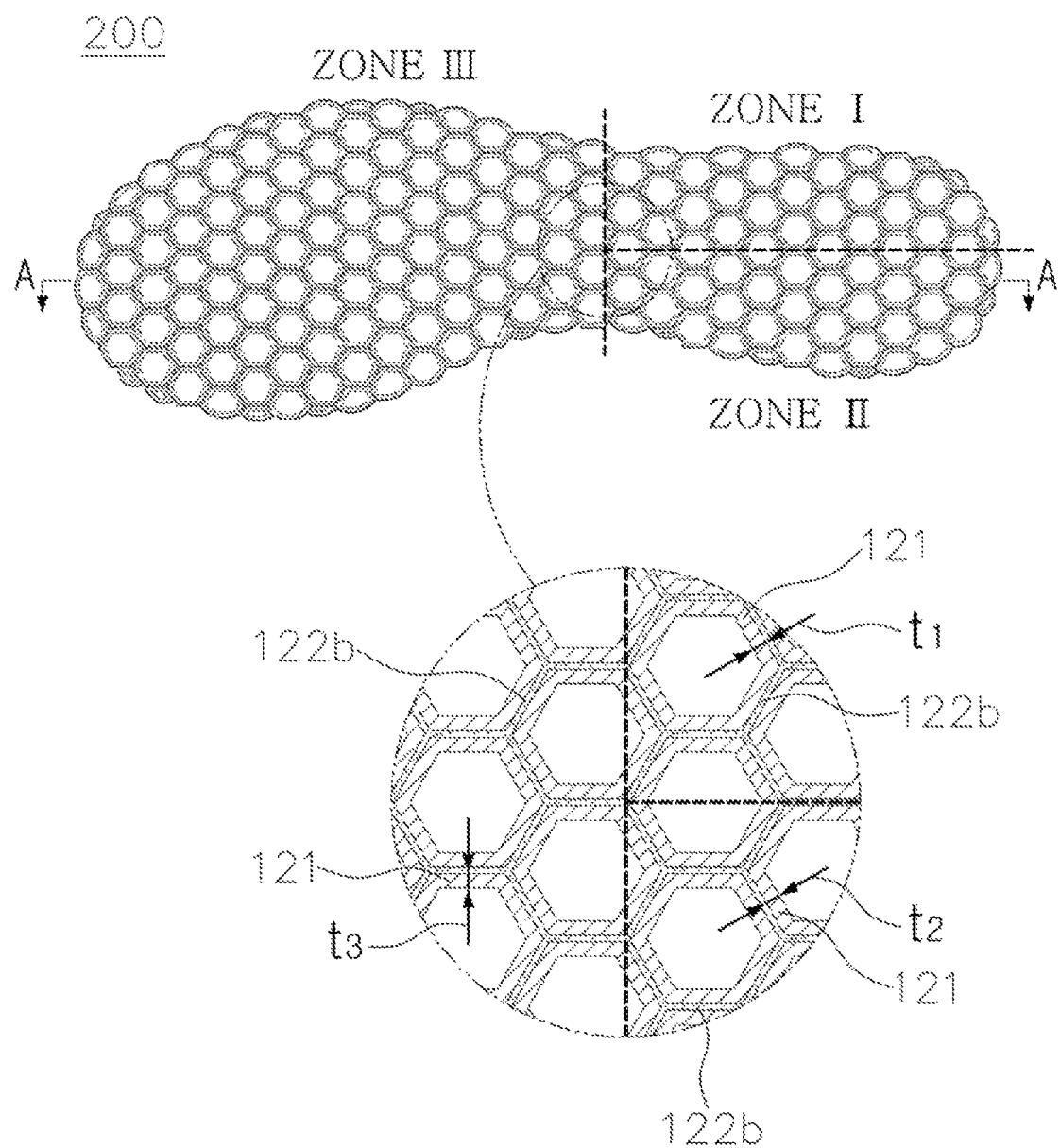
FIG. 5 is a schematic plan view illustrating a shoe sole obtained according to a second embodiment of the present invention.
Figure 6:
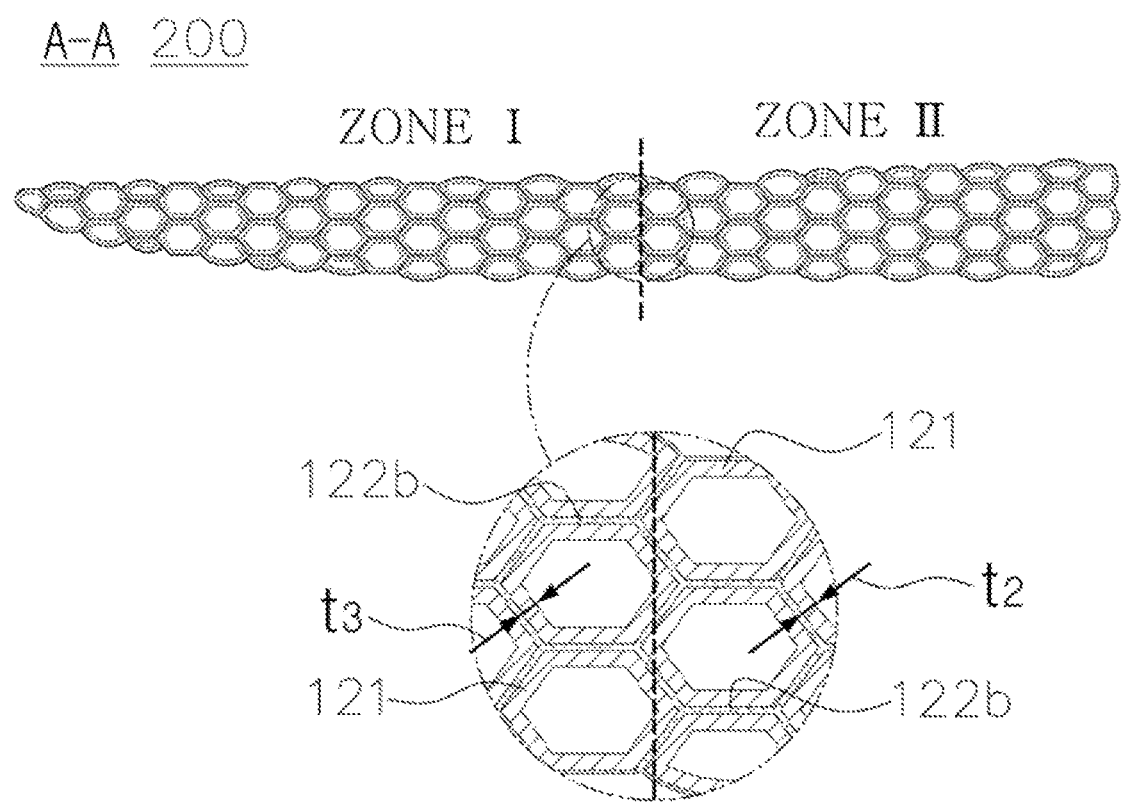
FIG. 6 is a cross-sectional view taken along line A-A' of FIG. 5.

FIG. 5 is a schematic plan view illustrating a shoe sole obtained according to a second embodiment of the present invention; and FIG. 6 is a cross-sectional view taken along line A-A' of FIG. 5.

As illustrated in FIG. 5, a shoe sole 200 according to the embodiment is divided into: a first zone (ZONE I) located at a rear outer side of the plan view; a second zone (ZONE II) located at a rear inner side of the plan view; and a third zone (ZONE III) located at a front side of the plan view.

In the embodiment, a layer thickness (t1) of the polyhedral hollow cells 121 located in the first zone is greater than a layer thickness (t2) of the polyhedral hollow cells 121 located in the second zone. The layer thickness (t2) of the polyhedral hollow cells 121 located in the second zone is greater than a layer thickness (t3) of the polyhedral hollow cells 121 located in the third zone.

That is, the polyhedral hollow cells 121 are made of the same material but configured such that the layer thickness decreases in order of the first zone, the second zone, and the third zone, which means t1>t2>t3. Accordingly, the first zone (ZONE I) located at the rear outer side has high elasticity and hardness, and the third zone (ZONE III) located at the front side has low elasticity and hardness.

In another embodiment, polyhedral hollow cells 121 have the same size and layer thickness. However, the polyhedral hollow cells 121 may be configured such that the hardness of the polyhedral hollow cells in the first zone (ZONE I) is greater than the hardness of the polyhedral hollow cells in the second zone (ZONE II), and the hardness of the polyhedral hollow cells in the second zone (ZONE II) is greater than the hardness of the third zone (ZONE III) whereby the first zone (ZONE I) located at the rear outer side has high elasticity and hardness, and the third zone (ZONE III) located at the front side has low elasticity and hardness.

Although the embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention. For example, each component described as a single type may be realized in a distributed manner, and similarly, components that are described as being distributed may be realized in a coupled manner.

The scope of the present invention is defined by the accompanying claims rather than the description which is presented above. Moreover, the present invention is intended to cover not only the exemplary embodiments, but also various alternatives, modifications, equivalents and other embodiments that may be included within the spirit and scope of the present invention as defined by the appended claims.

What is claimed is:

1. A method of manufacturing a shoe sole having polyhedral hollow cells, the method comprising:

preparing elastic balls each including a ball-shaped synthetic resin inner layer defining a space therein and a hot melt outer layer covering an outer surface of the synthetic resin inner layer;

loading the elastic balls in a shoe sole mold;

heating and compressing the elastic balls loaded in the shoe sole mold under a vacuum atmosphere such that the ball-shaped synthetic resin inner layers of the elastic balls are transformed into the polyhedral hollow cells by compression using a press, the polyhedral hollow cells being polyhedrons and each having an empty space formed therein, and the hot melt outer layers of the elastic balls are transformed into a molten hot melt that fills gaps between the polyhedral hollow cells;

cooling the polyhedral hollow cells while maintaining a state of the compression after the heating and compressing such that the molten hot melt is cooled and transformed into a hot melt adhesive part, wherein the hot melt adhesive part is disposed between the polyhedral hollow cells so that no voids are formed therebetween; and removing the shoe sole mold after the cooling to obtain the shoe sole having the polyhedral hollow cells.

\* \* \* \* \*